US008651455B2

(12) United States Patent
Albert et al.

(10) Patent No.: US 8,651,455 B2
(45) Date of Patent: Feb. 18, 2014

(54) DEVICE FOR CONVERTING A PIVOTING MOVEMENT OF A PINION INTO A TRANSLATIONAL MOVEMENT OF A SLIDE, AND VALVE COMPRISING SUCH A DEVICE

(75) Inventors: Laurent Albert, Vallangoujard (FR); Stephane Peyzarat, Le Mesnil en Thelle (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 864 days.

(21) Appl. No.: 12/595,939

(22) PCT Filed: Apr. 14, 2008

(86) PCT No.: PCT/FR2008/000513

§ 371 (c)(1), (2), (4) Date: Oct. 14, 2009

(87) PCT Pub. No.: WO2008/145834

PCT Pub. Date: Dec. 4, 2008

(65) Prior Publication Data

US 2010/0117013 A1 May 13, 2010

(30) Foreign Application Priority Data

Apr. 16, 2007 (FR) ..................................... 07 02723

(51) Int. Cl.
*F16K 31/44* (2006.01)

(52) U.S. Cl.
USPC ........ 251/248; 251/250.5; 251/251; 251/318; 251/129.11; 123/568.24; 74/57

(58) Field of Classification Search
USPC ......... 251/129.11, 248, 250, 250.5, 251, 259, 251/260, 318; 123/568.23, 568.24; 74/57
See application file for complete search history.

(56) References Cited

U.S. PATENT DOCUMENTS

| | | | | |
|---|---|---|---|---|
| 322,679 | A * | 7/1885 | Campbell | 74/57 |
| 3,101,622 | A * | 8/1963 | Johnson et al. | 74/89.16 |
| 3,492,880 | A * | 2/1970 | Pearson | 74/57 |
| 4,436,280 | A * | 3/1984 | Geisow | 251/229 |
| 4,651,969 | A * | 3/1987 | Dowdall | 251/14 |
| 4,690,119 | A * | 9/1987 | Makino et al. | 123/568.23 |

(Continued)

FOREIGN PATENT DOCUMENTS

| | | | |
|---|---|---|---|
| CH | 640 615 | A5 | 1/1984 |
| EP | 0 365 377 | A1 | 4/1990 |
| FR | 1552151 | A | 1/1969 |
| WO | 2005/021954 | A1 | 3/2005 |

OTHER PUBLICATIONS

International Search Report for PCT/FR2008/000513 mailed Dec. 10, 2008 (4 pages incl. English translation).

*Primary Examiner* — John K Fristoe, Jr.
*Assistant Examiner* — Marina Tietjen
(74) *Attorney, Agent, or Firm* — Osha Liang LLP

(57) ABSTRACT

A device, and a valve including such a device, for converting a pivoting movement of a pinion into a translational movement of a slide. The pinion is mounted to pivot relative to a slide mounting member including a fixed tubular wall. The tubular wall is provided with at least one cam surface acting on a follower roller mounted on a mounting part connected to the pinion in rotation and to the slide in translation. The pinion is carried by the mounting member coaxially with the tubular wall.

7 Claims, 3 Drawing Sheets

19 13 7 8 21 21 12 10 6 19 9 16 14 15 11 1 14 15 16 20 18 17 20 18 5 3 4 2

(56) References Cited

U.S. PATENT DOCUMENTS

| | | | | |
|---|---|---|---|---|
| 4,730,511 A * | 3/1988 | Tsujimura | 74/567 |
| 4,796,430 A * | 1/1989 | Malaker et al. | 62/6 |
| 5,005,805 A * | 4/1991 | Morris et al. | 251/229 |
| 5,108,073 A * | 4/1992 | Adachi | 251/163 |
| 5,269,492 A * | 12/1993 | McLennan | 251/229 |
| 6,007,047 A * | 12/1999 | Phipps | 251/252 |
| 6,769,665 B2 * | 8/2004 | Silva et al. | 251/71 |
| 6,886,546 B1 * | 5/2005 | Bircann et al. | 123/568.23 |
| 7,461,642 B2 * | 12/2008 | Bircann et al. | 123/568.23 |
| 8,171,919 B2 * | 5/2012 | Klipfel et al. | 123/568.23 |
| 2004/0069285 A1 * | 4/2004 | Telep et al. | 123/568.23 |
| 2008/0230040 A1 * | 9/2008 | Wilson et al. | 123/568.18 |
| 2012/0138029 A1 * | 6/2012 | Albert et al. | 123/568.23 |

* cited by examiner

FIG_1

DEVICE FOR CONVERTING A PIVOTING MOVEMENT OF A PINION INTO A TRANSLATIONAL MOVEMENT OF A SLIDE, AND VALVE COMPRISING SUCH A DEVICE

This invention relates to a device for converting a pivoting movement of a pinion into a translational movement of a slide, and a valve comprising such a device. A valve of this kind can be used for example in an exhaust gas recirculation circuit of a heat engine of a motor vehicle.

BACKGROUND OF THE INVENTION

A valve of this kind generally comprises a body in which there slides a valve head connected to an output pinion of a rotary motor via a device which converts a pivoting movement of a pinion, meshing with the output pinion, into a translational movement of a slide connected to the valve head and mounted so as to slide inside the body via a guide liner. The pinion is mounted so as to pivot relative to a slide mounting member comprising a tubular wall fixed inside the body. The tubular wall is provided with cam surfaces which each act on a follower roller mounted on a mounting part. The latter is on the one hand rotated by an eccentric fork connected in rotation to the pinion, and on the other hand is mounted so as to pivot on one end of the slide. The mounting part is thus driven rotationally by the pinion, causing the rollers to move along the cam surfaces, which are designed to bring about a translational movement of the mounting part which in turn carries with it the slide and the valve head.

The pinion is connected to one end of a spindle whose other end is connected to the rotary drive fork of the mounting part. The spindle is mounted pivotally in a rotary guide liner force-fitted into a plate fixed to the body. Correct operation and long life of the valve and of the conversion device require accurate relative positioning of the body, the valve head, the tubular wall, the plate, the guide liners, the spindle, the pinion and the fork otherwise there will be premature wear of all or some of these components. Achieving the requisite positioning accuracy makes the assembly and machining of the components relative expensive.

OBJECT OF THE INVENTION

It is an object of the invention to reduce the assembly constraints affecting the motion conversion device in order to reduce the cost of the products in which it can installed.

SUMMARY OF THE INVENTION

To this end the invention provides a device for converting a pivoting movement of a pinion into a translational movement of a slide, the device comprising a slide mounting member and a mounting part connected to the pinion in rotation and to the slide in translation, the pinion being mounted so as to pivot relative to the mounting member which comprises a fixed tubular wall, and the tubular wall being provided with at least one cam surface acting on a follower roller mounted on the mounting part, and the pinion being carried by the mounting member coaxially with the tubular wall.

The pinion is thus mounted directly on the mounting member without an intermediate plate. It is thus easier to achieve correct relative positioning of the pinion and mounting member.

In one advantageous embodiment, the mounting member comprises a pivot which is coaxial with the tubular wall and on which the pinion is mounted and, preferably, the mounting member is a bell with a crown to which the pivot is connected, the crown having an opening for the passage of a connecting part connecting the pinion to the mounting part.

The mounting member and the pivot can thus easily be made in one piece.

The device preferably comprises a leg extending from the pinion to the mounting part to form a connecting part between the pinion and the mounting part, the leg having one end fixed to the pinion and comprising at the opposite end an end portion that slides inside a housing in the mounting part, and the housing being advantageously fitted with a liner with a low coefficient of friction.

The connecting part, which is structurally simple, is fitted directly into the pinion. This limits the number of parts and the weight of the device.

The invention also relates to a valve comprising a body in which there slides a valve head connected to an output pinion of a rotary drive motor by a device for converting a pivoting movement of a pinion meshing with the output pinion into a translational movement of a slide connected to the valve head, and the conversion device being in accordance with that set forth above.

The structure of the valve is relatively simple and its assembly is simplified.

Other features and advantages of the invention will become apparent on reading the following description of one particular non-restrictive embodiment of the invention.

BRIEF DESCRIPTION OF THE DRAWINGS

Reference will be made to the attached drawings in which.

DETAILED DESCRIPTION OF THE INVENTION

Figure 1:
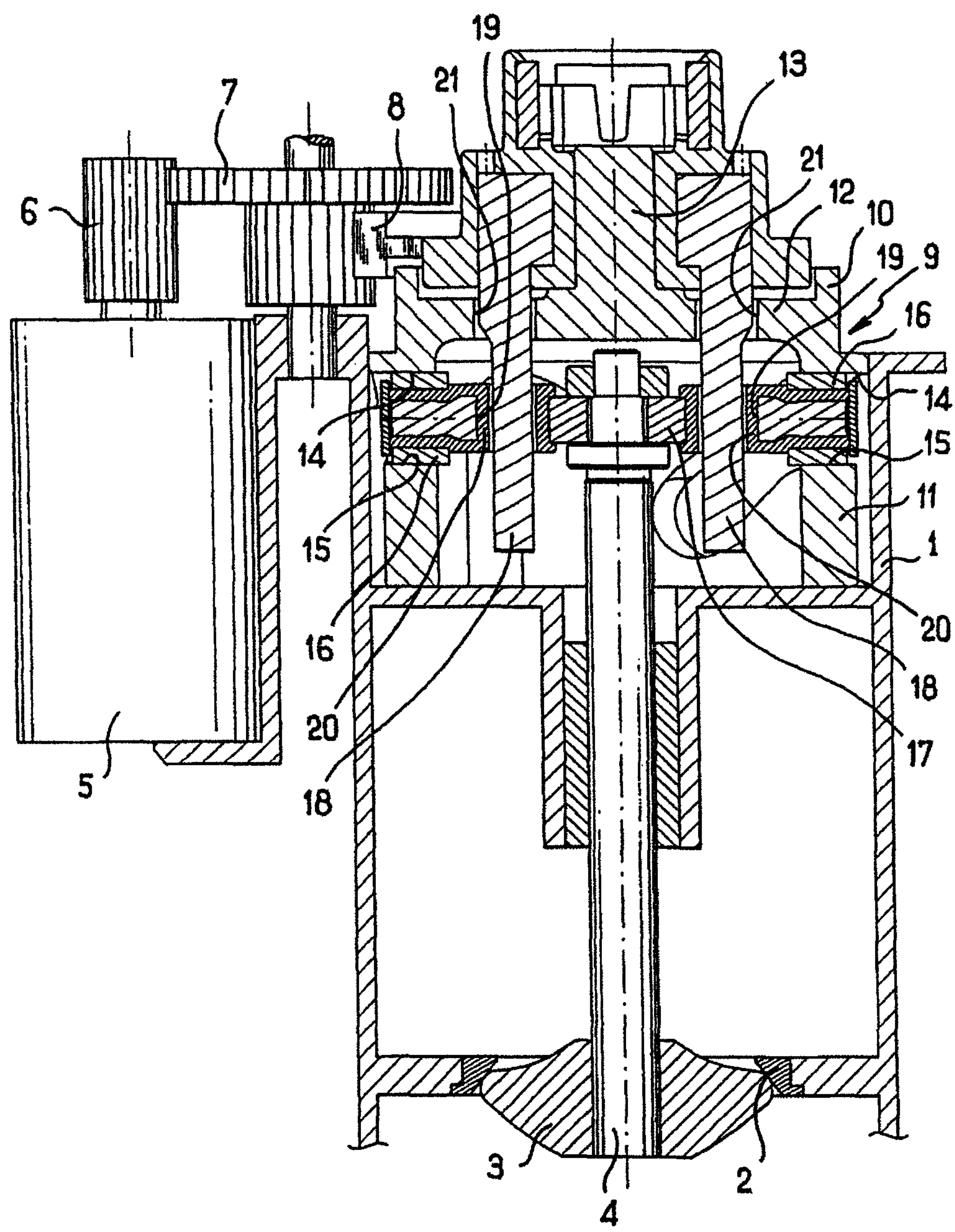
FIG. 1 is a partial cross section through a valve according to the invention.
Figure 2:
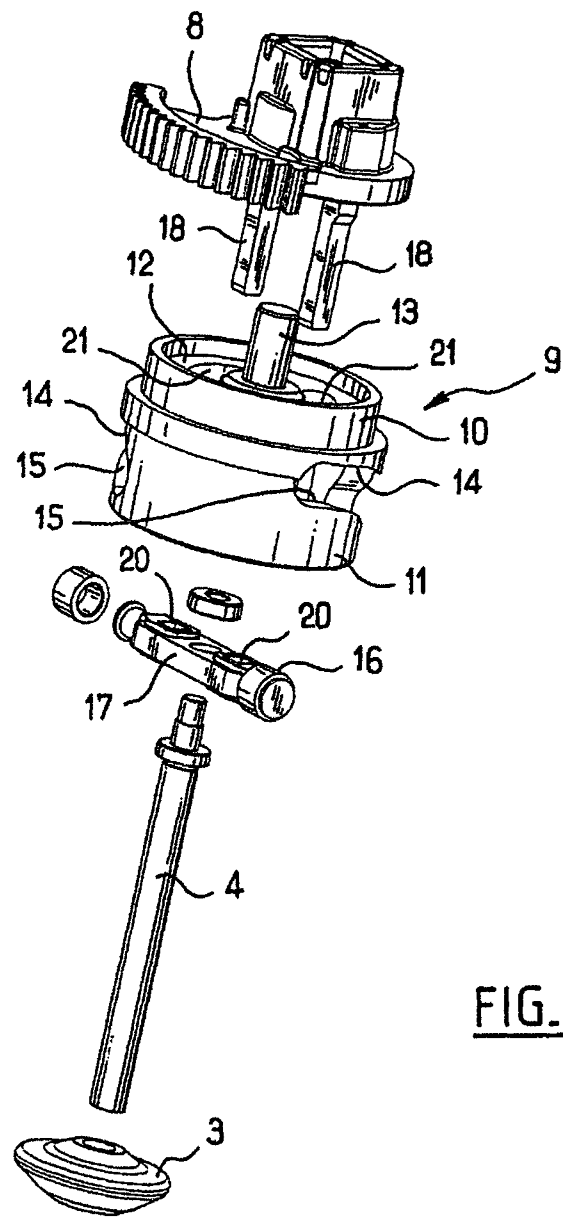
FIG. 2 is an exploded perspective view of the motion conversion device of this valve.
Figure 3:
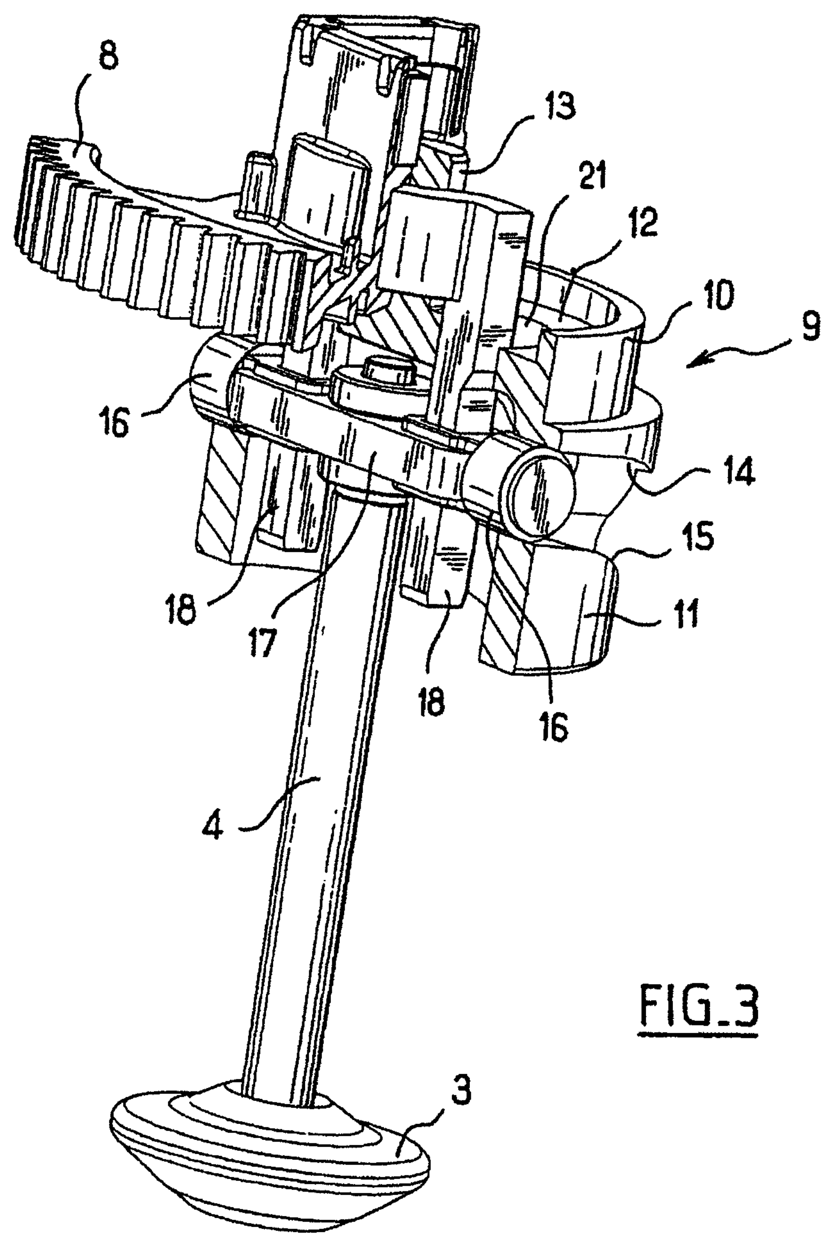
FIG. 3 is a perspective view, with partial cutaway, of this conversion device.

Referring to the figures, the valve of the invention comprises a body 1 defining a seat 2 for a valve head 3 mounted on one end of a rod forming a slide 4 mounted in the body 1 so as to slide between a closed position in which the valve head 3 is in contact with the seat 2 and an open position in which the valve head 3 is off the seat 2.

A motor 5 is fixed inside the body 1 for the purpose of moving the slide 4, and hence the valve head 3, translationally. The motor 5 has an output pinion 6 connected by a gear train 7 to a pinion 8 formed by a toothed sector. The gear train 7 is mounted on the body 1. The output pinion 6, the gear train 7 and the pinion 8 pivot about axes parallel to the direction in which the slide 4 slides. The pinion 8 is connected to a device, given the general reference 9, which converts a rotational movement of the pinion 8 into a translational movement of the slide 4.

The device 9 comprises a mounting member 10 in the form a bell fixed inside the body 1, comprising a tubular wall 11 concentric with the direction of sliding of the slide 4, and a crown 12 to which is connected a pivot 13 coaxial with the tubular wall 11. The pinion 8 is mounted so as to pivot freely on the pivot 13 in such a way that the mounting member 10 carries the pinion 8 directly.

Two grooves 14 are formed transversely in the tubular wall 11 in diametrically opposite positions. Each groove 14 is approximately in the shape of a portion of a helix with a lower edge in the form of a ramp forming a cam surface 15 on which a roller 16 rolls. The rollers 16 are mounted on the ends of a mounting part 17 which is mounted in such a way as to pivot on the end of the slide 4 furthest from the valve head 3 and which extends diametrically across the space bounded by the tubular wall 11. The mounting part 17 is mounted so that it cannot move translationally on the slide 4.

The mounting part 17 is connected in rotation to the pinion 8 by connecting parts 18, each formed by a leg extending parallel to the sliding direction and having one end connected to the pinion 8 and at the other end an end portion which slides inside housings 19 formed in the mounting part 17 and fitted with liners 20 which have a low coefficient of friction. Notice that the bearings of the rollers 16 are formed in one piece with the liner 20. Openings 21 in the form of arcs of a circle formed in the crown 12 allow the passage of the connecting parts 18 and allow them to move in an arc of a circle concentric with the pivot 13.

When the output pinion 6 turns, it turns the pinion 8 via the gear train 7. The pinion 8 turns the mounting part 17 through the connecting parts 18. When the mounting part 17 turns, it moves the rollers 16 along the cam surfaces 15, and the rollers 16, acted upon by the cam surfaces 15, produce a translational movement of the mounting part 17 and hence of the slide 4 and the valve head 3. Since the mounting part 17 is pivoted to the slide 4, the mounting part 17, when turned by the pinion 8 via the connecting parts 18, exerts no couple on the valve head 3 and so limits the rubbing of the valve head 3 on its seat.

The invention is not of course limited to the embodiment described but rather encompasses any variant that is within the scope of the invention as defined by the claims.

In particular, the means for guiding the rotation of the pinion 8 may be formed by a male part, such as the pivot 13, or by a female part such as a housing designed to guide the periphery of the pinion 8. The pivot 13 may be fixed rigidly to the crown 12 of the mounting member 10.

The shape of the mounting member 10 may differ from that described. For example, the crown 12 may be replaced by a diametrical beam supporting the pivot 13.

The legs 18, which are the connecting parts, may have one end fixed to the mounting part and an opposite end portion mounted so as to slide in a housing in the pinion 8.

The connecting parts may have a structure that differs from that described and may be formed for example by forks for driving the mounting part 17.

The cam surfaces 15 may be formed by a projecting rib on the tubular wall 11.

The pinion 8 may be connected to the output pinion of the motor by a belt, or any other transmission means. The motor may be mounted with its axis at an angle to the direction of sliding.

What is claimed is:

1. A device for converting a pivoting movement of a pinion into a translational movement of a slide, the device comprising:

a slide mounting member and a mounting part connected to the pinion in rotation and to the slide in translation, wherein the pinion is mounted to pivot relative to the mounting member which comprises a fixed tubular wall, and wherein the tubular wall is provided with at least one cam surface acting on a follower roller mounted on the mounting part, wherein the pinion is carried by the mounting member coaxially with the tubular wall, wherein the mounting member comprises a pivot which is coaxial with the tubular wall and on which the pinion is mounted, and wherein the mounting member is a bell with a crown to which the pivot is connected, the crown having an opening that is crossed over by a connecting part connecting the pinion to the mounting part, wherein the opening is positioned between the pinion and the mounting part.

2. A device for converting a pivoting movement of a pinion into a translational movement of a slide, the device comprising:

a slide mounting member and a mounting part connected to the pinion in rotation and to the slide in translation, wherein the pinion is mounted to pivot relative to the mounting member which comprises a fixed tubular wall, and wherein the tubular wall is provided with at least one cam surface acting on a follower roller mounted on the mounting part, wherein the pinion is carried by the mounting member coaxially with the tubular wall, and a leg extending from the pinion to the mounting part to form a connecting part between the pinion and the mounting part, in which the leg has one end fixed to the pinion and comprises at an opposite end an end portion that slides inside a housing in the mounting part.

3. The device as claimed in claim 2, in which the housing is fitted with a liner with a low coefficient of friction.

4. A device for converting a pivoting movement of a pinion into a translational movement of a slide, the device comprising:

a slide mounting member and a mounting part connected to the pinion in rotation and to the slide in translation, wherein the slide mounting member is a bell with a crown to which the pivot is connected, the crown having an opening that is crossed over by a connecting part connecting the pinion to the mounting part, wherein the opening is positioned between the pinion and the mounting part, wherein the pinion is mounted to pivot relative to the mounting member which comprises a fixed tubular wall, and wherein the tubular wall is provided with at least one cam surface acting on a follower roller mounted on the mounting part, wherein the pinion is carried by the mounting member coaxially with the tubular wall in which the pinion is formed by a toothed sector.

5. A valve comprising:

a body in which there slides a valve head connected to an output pinion of a rotary drive motor by a device for converting a pivoting movement of a pinion meshing with the output pinion into a translational movement of a slide connected to the valve head, wherein the device comprises:

a slide mounting member and a mounting part connected to the output pinion in rotation and to the slide in translation, wherein the pinion is mounted to pivot relative to the mounting member which comprises a fixed tubular wall, and wherein the tubular wall is provided with at least one cam surface acting on a follower roller mounted on the mounting part, wherein the pinion is carried by the mounting member coaxially with the tubular wall wherein the mounting member comprises a pivot which is coaxial with the tubular wall and on which the pinion is mounted, and wherein the mounting member is a bell with a crown to which the pivot is connected, the crown having an opening that is crossed over by a connecting part connecting the pinion to the mounting part, wherein the opening is positioned between the pinion and the mounting part.

6. A valve comprising:

a body in which there slides a valve head connected to an output pinion of a rotary drive motor by a device for converting a pivoting movement of a pinion meshing with the output pinion into a translational movement of a slide connected to the valve head, wherein the device comprises a slide mounting member and a mounting part connected to the output pinion in rotation and to the slide in translation, wherein the pinion is mounted to pivot relative to the mounting member which comprises a fixed tubular wall, and wherein the tubular wall is provided with at least one cam surface acting on a follower roller mounted on the mounting part, wherein the pinion is carried by the mounting member coaxially with the tubular wall, and a leg extending from the pinion to the mounting part to form a connecting part between the pinion and the mounting part, in which the leg has one end fixed to the pinion and comprises at an opposite end an end portion that slides inside a housing in the mounting part.

7. A valve comprising:

a body in which there slides a valve head connected to an output pinion of a rotary drive motor by a device for converting a pivoting movement of a pinion meshing with the output pinion into a translational movement of a slide connected to the valve head, wherein the device comprises:

a slide mounting member and a mounting part connected to the output pinion in rotation and to the slide in translation, wherein the slide mounting member is a bell with a crown to which the pivot is connected, the crown having an opening that is crossed over by a connecting part connecting the pinion to the mounting part, wherein the opening is positioned between the pinion and the mounting part, wherein the pinion is mounted to pivot relative to the mounting member which comprises a fixed tubular wall, and wherein the tubular wall is provided with at least one cam surface acting on a follower roller mounted on the mounting part, wherein the pinion is carried by the mounting member coaxially with the tubular wall, and wherein the pinion is formed by a toothed sector.

* * * * *